United States Patent
Mangano et al.

(10) Patent No.: US 11,025,289 B2
(45) Date of Patent: Jun. 1, 2021

(54) POWER MANAGEMENT METHOD, CORRESPONDING SYSTEM AND APPARATUS

(71) Applicant: STMicroelectronics S.r.l., Agrate Brianza (IT)

(72) Inventors: Daniele Mangano, San Gregorio di Catania (IT); Pasquale Butta', Messina (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 16/800,793

(22) Filed: Feb. 25, 2020

(65) Prior Publication Data

US 2020/0280332 A1    Sep. 3, 2020

(30) Foreign Application Priority Data

Feb. 28, 2019    (IT) .................. 102019000002963

(51) Int. Cl.
*H04B 1/40* (2015.01)
*H02M 1/00* (2006.01)

(52) U.S. Cl.
CPC ............... *H04B 1/40* (2013.01); *H02M 1/00* (2013.01); *H02M 2001/0045* (2013.01)

(58) Field of Classification Search
CPC .. H04B 1/40; H02M 1/00; H02M 2001/0032; H02M 2001/0045; G06F 1/26; G06F 1/32; G06F 1/3243; G06F 1/325; G06F 1/3287

USPC ............................................ 455/127.1, 343.1
See application file for complete search history.

(56) References Cited

U.S. PATENT DOCUMENTS

| | | | | |
|---|---|---|---|---|
| 5,877,564 | A * | 3/1999 | Kuiri | H02J 7/0068 307/38 |
| 2005/0071693 | A1* | 3/2005 | Chun | G06F 1/3237 713/300 |
| 2015/0249335 | A1 | 9/2015 | Waheed et al. | |
| 2015/0331434 | A1* | 11/2015 | Lintonen | G05F 1/468 323/313 |

* cited by examiner

*Primary Examiner* — Lee Nguyen
(74) *Attorney, Agent, or Firm* — Slater Matsil, LLP

(57) ABSTRACT

A method for power management in an electronic circuit that comprises a processing system and an RF embedded circuit includes: generating a first regulated voltage with a power regulation module of the RF embedded circuit; generating a second regulated voltage from the first regulated voltage with a first linear regulator of the processing system; and controlling the power regulation module of the RF embedded circuit to operate according to a plurality of operation modes. The operation modes include: a first sleep mode in which a switched-mode power supply of the RF embedded circuit is off and a second linear regulator of the RF embedded circuit is off; a second sleep mode in which a switched-mode power supply is off and the second linear regulator is on; and a third sleep mode in which the switched-mode power supply is on and the second linear regulator is off.

20 Claims, 10 Drawing Sheets

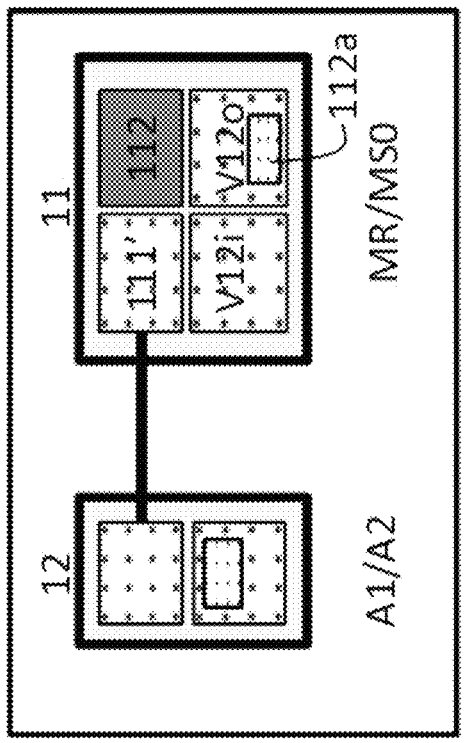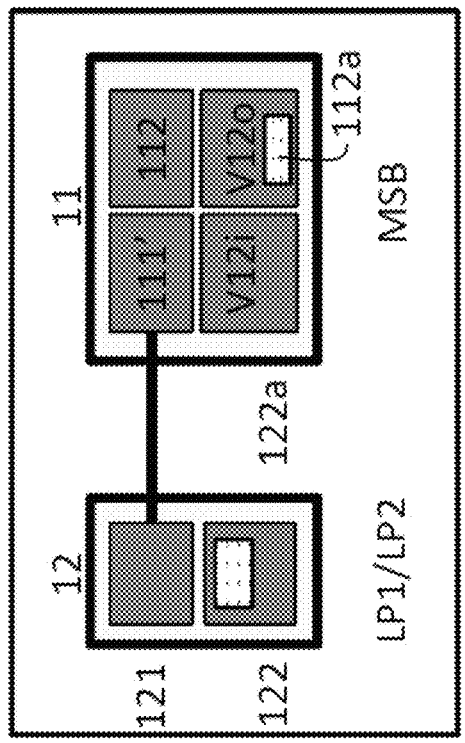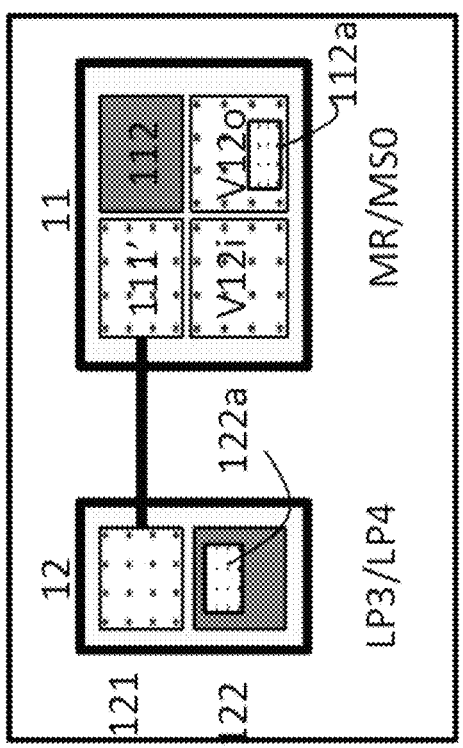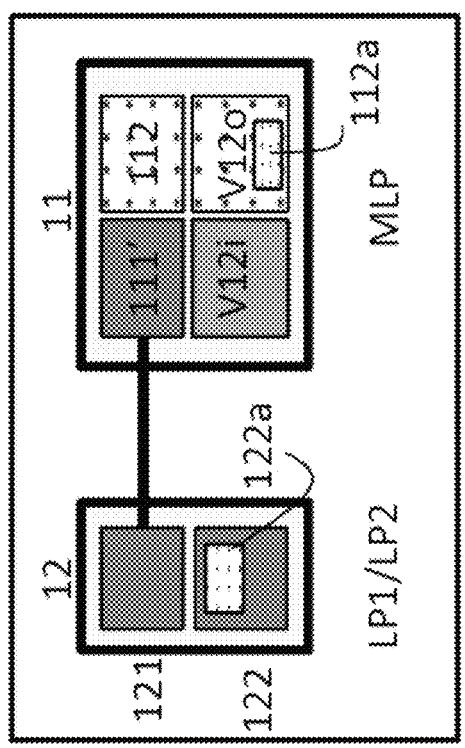

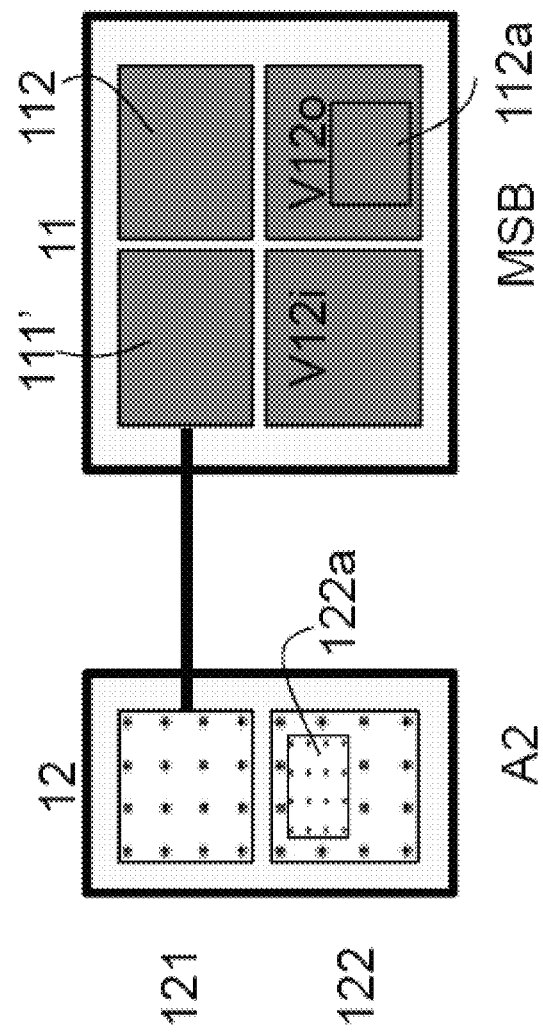

POWER MANAGEMENT METHOD, CORRESPONDING SYSTEM AND APPARATUS

CROSS-REFERENCE TO RELATED APPLICATIONS

This application claims priority to Italian Patent Application No. 102019000002963, filed on Feb. 28, 2019, which application is hereby incorporated herein by reference.

TECHNICAL FIELD

The present disclosure relates generally to an electronic system and method, and, in particular embodiments, to a power management method, corresponding system and apparatus.

BACKGROUND

Various emerging application scenarios, such as the Internet of Things (IoT) or the automotive area have fostered increased interest for microcontroller base applications with radiofrequency (RF) capability.

A certain degree of integration between microcontrollers and RF circuits, in particular third party circuit(s) cores for RF transceiving, is thus desirable also for general purpose products such as consumer products (e.g., home appliances such as TV screens, refrigerators, washing machines and so on) employing microcontrollers in order to ensure proper handling of these aspects. An increased attention is thus paid to sharing functions between such RF circuits, in particular RF circuit cores and general purpose microcontrollers or Systems-on-Chip (SoC).

In processing units for general purpose application, such as microcontrollers or SoCs (e.g., like the STM32 microcontroller), which have low power operation and a reduced package pin count, problems of power consumption reduction, which is generally a strong requirement for IoT applications, may be encountered, and also problems regarding the necessity of silicon area reduction.

Independent power management of the microcontroller and the RF unit may result in a less power efficient system, which is more costly in term of area, Bill Of Materials (BOM) and other aspect, and also adds software complexity.

Having a system where the power management of the microcontroller and the RF unit are not independent may result in less power reduction and more software complexity.

SUMMARY

Some embodiments provide power consumption reduction and silicon area reduction in processing system like microcontrollers associated to RF circuits.

One or more embodiments may relate to a corresponding electronic circuit.

One or more embodiments may relate to a corresponding apparatus (e.g., a consumer product such as a microcontroller-based consumer product such as a home appliance).

Some embodiments relate to techniques for managing the power supply in an electronic circuit comprising a processing system. In some embodiments, the electronic circuit is a general purpose microcontroller or a SoC, or a subsystem thereof, with an RF embedded circuit.

In some embodiments, the processing system comprises at least a processing core and a first power regulation module supplying a first regulated voltage to the processing core.

In some embodiments, the RF embedded circuit comprises a second power regulation module supplying a second regulated voltage to circuits of the RF embedded circuit including a RF transceiving portion, the second power regulation module comprising a switched-mode power supply and generating a second regulated voltage.

In some embodiments, a method comprises:

coupling the second regulated voltage as voltage input of the first power regulation module, wherein the first power regulation module generates as an output a respective first regulated voltage for the processing core;

controlling the second power regulation module to operate according to a plurality of operation modes, including one or more sleep modes in which both the DC-DC converter and the second linear regulator are off, and one or more active modes in which both the DC-DC converter and the second linear regulator are on.

One or more embodiments may be applied to a system comprising microcontrollers or SoC arrangements for general purpose applications operating in association with RF transceivers, such as for LoRa applications.

One or more embodiments provide advantages in terms of application/product differentiation. For example, even if power management is shared, the RF circuit and processing system can independently operate (e.g., the RF circuit can be active with the processing system in low power mode and vice versa). In some embodiments, a reduced application BOM is obtained as well as an optimized pinout (e.g., more GPIOs).

One or more embodiments provide an optimization of the silicon area by sparing a DC-DC converter.

BRIEF DESCRIPTION OF THE DRAWINGS

One or more embodiments will now be described, by way of example only, with reference to the annexed figures, wherein:

FIGS. 5A-5E are exemplary of operation states of the electronic circuit according to the method according to one or more embodiments;

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Figure 1:
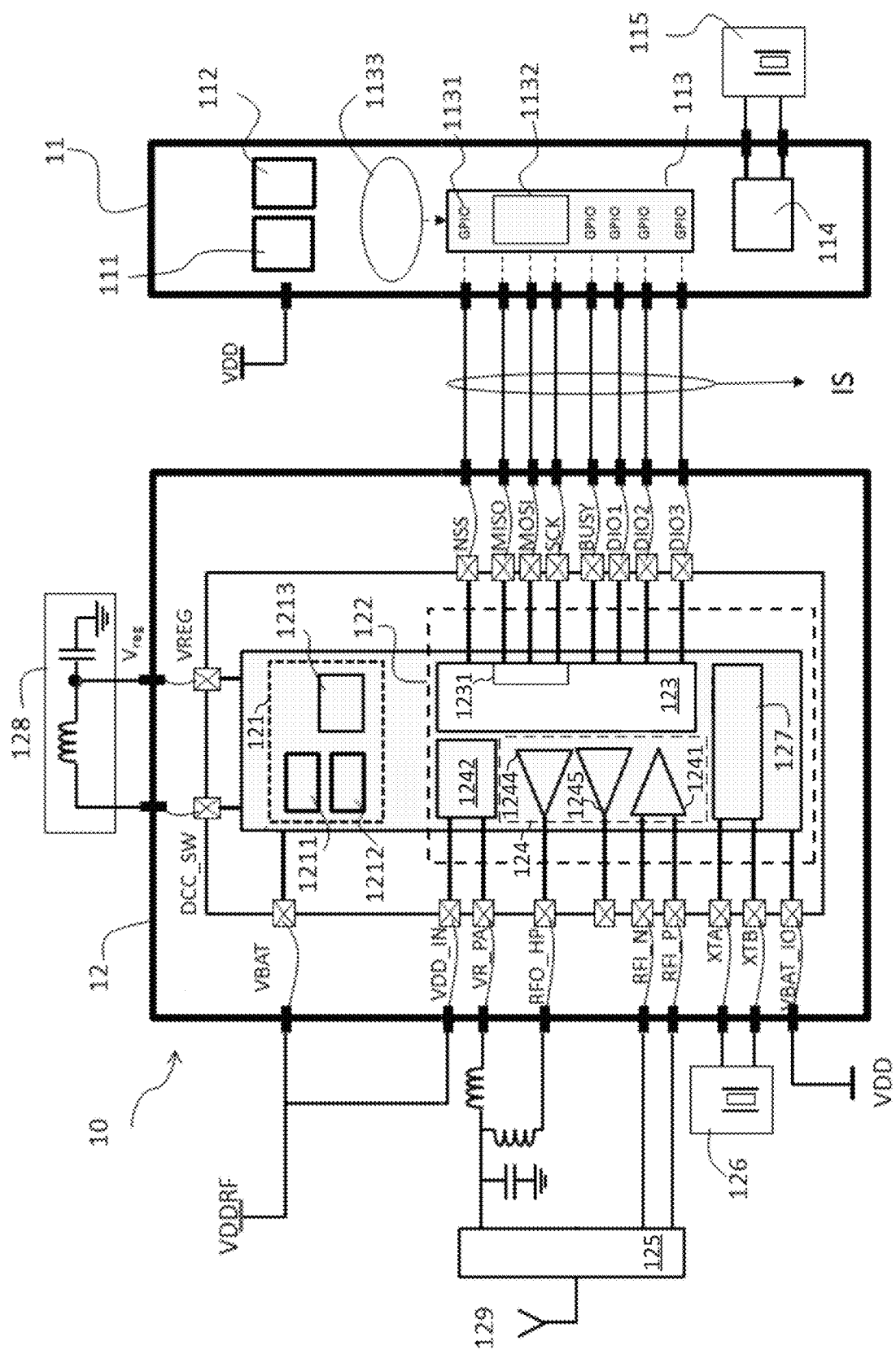
FIG. 1 is exemplary of an electronic circuit employing a processing system and an embedded RF circuit.

In FIG. 1 it is shown a system 10 on a PCB (Printed Circuit Board). System 10 includes a processing system, specifically a general purpose microcontroller 11, embedded with an RF circuit 12. The general purpose microcontroller 11 may be of the type of STM32 microcontroller. In variant embodiments can be a different general purpose microcontroller or System on Chip.

The RF circuit 12 may be a low power low range (LoRa) transceiver. A possible example is the LoRa transceiver Semtech SX1262.

In the microcontroller 11 are shown some of the components relevant to understand the present solution. Thus, microcontroller 11, which includes a microprocessor core 30 (not shown in FIG. 1) includes a main voltage regulator 111 and a low power regulator 112. Main voltage regulator 111 is to be used in state or modes of normal active operation, and may be a DC-DC converter. Low power regulator is to be used for low power operation.

Microcontroller 11 also includes a GPIO (General Purpose Input Output) interface module 113. GPIO interface module 113 includes GPIO interfaces 1131. GPIO interface module 113 also includes SPI (Serial Parallel Interface) master interface 1132. A corresponding interface in the RF circuit 12 is the SPI interface 1231 in control module 123. An external oscillator management module 114 is coupled to an external oscillator 115 to obtain a clock reference.

RF circuit 12 includes RF power regulator block 121. RF power regulator block 121 includes switched-mode power supply (i.e., a DC/DC converter) 1211, linear voltage regulator 1212, such as an LDO (Low Drop Out) regulator, and power on reset voltage monitor 1213. Power on reset voltage monitor 1213 monitors the voltage upon a power on after reset of the RF circuit 12.

Filter 128 is connected between a voltage regulated pin VREG and a DC-DC switcher output terminal DCC_SW. A regulated output voltage $V_{reg}$ is generated from RF power regulator block 121 generates at the VREG pin. Regulated output voltage $V_{reg}$ may have a value between 1.45 V and 1.62V, such as of 1.55V.

DC-DC switcher output terminal DCC_SW is coupled to the output of DC/DC converter 1211. The pin VREG (i.e., the external terminal of the package of the RF circuit 12) and the other pins of the circuit 12 are shown as wire bonded to a corresponding internal pad, the label referring to the whole of pin, wire bond and pad for simplicity of representation.

RF circuit 12 also includes RF module 122. RF module 122 includes a digital interface and control module 123 (i.e., a digital front end) that comprises all payload data and protocol processing as well as access to configuration of the radio via SPI interface 1231. Digital interface and control module 123 includes interface and control terminals IS. Control terminals IS includes SPI terminals comprising a MISO SPI slave output, a MOSI SPI slave input, a SCK SPI clock, and an NSS SPI Slave Select. Control terminals IS also include a busy indicator BUSY, and digital input output pins DIO1, DIO2, DIO3.

Interface and control terminals IS of RF circuit 12 are associated to the GPIO interface module 113. In particular, the MISO, MOSI, SCK terminals, representing SPI slave interface 1231 are coupled to the Master SPI interface 1132 of the GPIO interface module 113, while the remaining terminals are coupled to the GPIO interfaces, to, e.g., exchange SPI commands to control power state and RF operation, under the control of a LoRa SW Stack 1133. More in general the SPI interface allows the full control of the RF modules (e.g., send data to be transferred, read received data, set band, etc.)

FIG. 1 also shows an analog front end 124 of the RF circuit 12. Analog front end 124 includes a receiving portion represented by a Low Noise Amplifier (LNA) 1241. LNA 1241 receives an RF input (at terminals RFI_N and RFI_P) from a matching network 125 of an RF antenna 129.

A power amplifier 1242 receives a regulated power amplifier supply at a pin VR_PA from the matching network 125. Power amplifier block 1242 includes power amplifier regulator 1243 (not shown in FIG. 1) coupled to a digital voltage supply input terminal VDD_IN. Supply input terminal VDD_IN is coupled to digital RF voltage supply VDDRF which may have values between 1.8 V and 3.7 V.

Power amplifier regulator 1243 supplies regulated power to a high pass section and a low pass section of power amplifiers 1244, 1245, supplying the output RF signal under the control of modems of the RF circuit 12 (here not shown). In FIG. 1, it is shown the high pass section 1244 coupled to the matching network 125 as RF transmitter output on the terminal RFO_HP.

An external oscillator 126 is coupled to an RF external oscillator management unit 127 inside the RF circuit 12 through terminals XTA and XTB.

The RF circuit 12 has two power supply pins, one for the core of the transceiver 122 called battery voltage VBAT, and one for the host controller interface (SPI, DIOs, BUSY) called input output battery voltage VBAT_IO. The input output battery voltage VBAT_IO is coupled to a digital voltage supply VDD (e.g., 3.3 V). Digital voltage supply VDD also powers the digital circuits of the microcontroller 11. Both power supplies (VBAT and VBAT_IO) can be connected together in application. In case a low voltage micro-controller (typically with IO pads at 1.8 V) is used to control the transceiver 12, the user can:

use terminal corresponding to the battery voltage VBAT at 3.3 V for optimal RF performance;

directly couple terminal corresponding to the input output battery voltage VBAT_IO to the same supply used for the microcontroller 11; or couple the digital input output directly to the microcontroller digital input output.

Generally, at any time, the voltage on pin VBAT_IO must be lower than or equal to the voltage on pin VBAT. Thus, in FIG. 1, the pin VBAT_IO is indicated as coupled to a voltage VDD, corresponding to a microcontroller digital voltage VDD used by the microcontroller 11, and having values between 1.6 V and 3.6 V.

Figure 2:
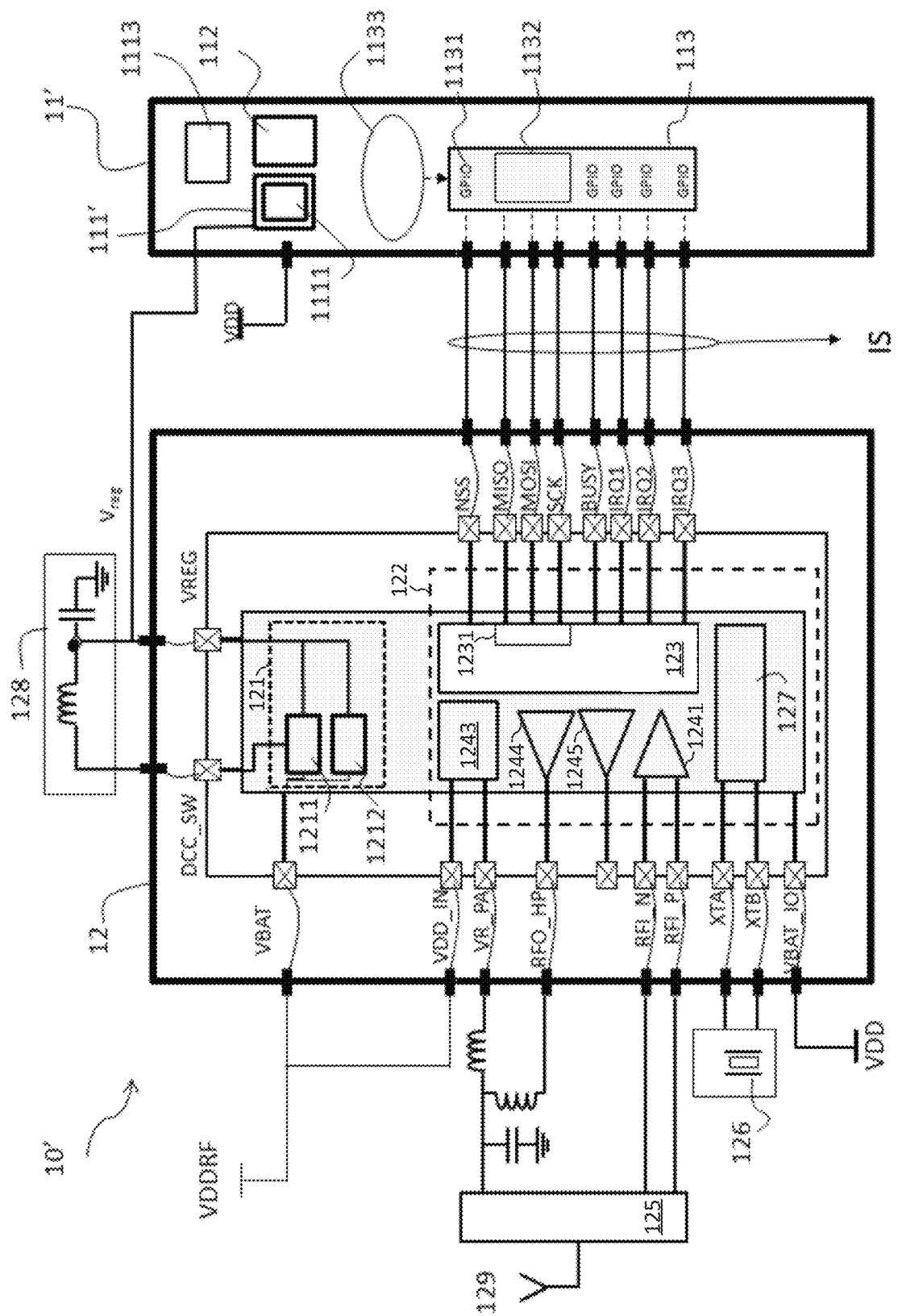
FIG. 2 is exemplary of an electronic circuit on which the method according to one or more embodiments is applied.

In FIG. 2 it is shown a system 10'. System 10' corresponds to system 10, with the exception of some functionalities of the microcontroller 11' and RF circuit 12 which are merged together, by adapting the microcontroller 11'.

A functionality which is merged regards the external oscillator. The external oscillator control module 114 and the external oscillator 115 are not present in the microcontroller 11'. Instead, the functionality of oscillator control module 114 and external oscillator 115 is obtained by the external oscillator 126 of the RF circuit 12.

Power management of the microcontroller 11' includes a power on reset voltage monitor 1113, which was previously in the power regulator 121 of the RF circuit 12 (see 1213 in FIG. 1). Power management of the microcontroller 11' does not include any longer a DC-DC converter (inside 111 of FIG. 1). Instead, main power regulator 111' here includes simply a linear regulator (LDO) 1111, where the system 10' exploits the DC-DC converter 1211 of the RF circuit 12 by coupling the regulated voltage $V_{reg}$ outputted from the power regulator 121 on pin VREG to the voltage input of the main power regulator 111', specifically of the linear regulator 1111. Linear regulator 1111 regulates such regulated voltage $V_{reg}$ to produce as output a microcontroller regulated voltage $V_{regm}$, as better shown in FIG. 3.

Regulators 1211 and 1212 receive the input voltage VDDRF from the VBAT pin and each regulator is connected to the pin VREG to supply the voltage $V_{reg}$.

The main power regulator 111' receives preferably as input voltage also the digital voltage VDD, as the second low power regulator 112 so that the microcontroller 11' can select between the regulated voltage $V_{reg}$, and the digital voltage VDD, if necessary. The power regulator 121 of the RF circuit 12 receives the RF digital voltage supply VDDRF (e.g., between 1.8 V and 3.7 V) as voltage input of regulators 1211 and 1212.

In some embodiments, at any time, the voltage on pin VBAT_IO must be lower than or equal to the voltage on pin VBAT, e.g., at any time, the voltage VDD must be lower than or equal to the voltage VDDRF.

Thus, in some embodiments, the system 10' shares the RF DC/DC 1211 with the microcontroller 11' in order to optimize power efficiency, BOM, and pinout. In some embodiments, such as in embodiments described herein, the specification of the power efficiency of the RF DC/DC are in the range of 80-90% (depending on load). Also the microcontroller 11 DC/DC silicon area is spared. Regarding the BOM, in some embodiments, only one filter (filter 128) is needed on the PCB. Regarding the pin-out, in some embodiments, by default two dedicated pins of the microcontroller 11 are saved.

Figure 4:
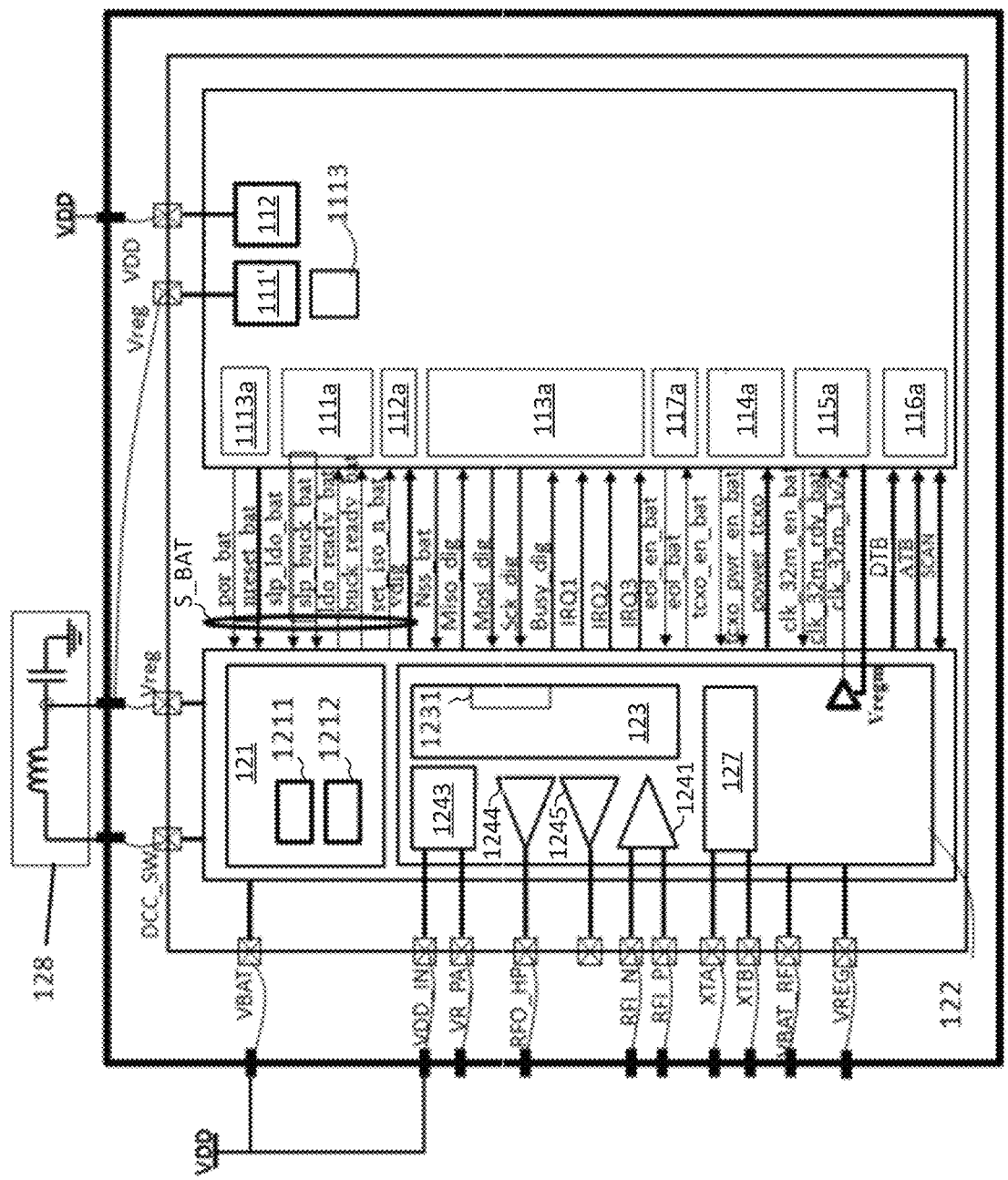
FIG. 4 is exemplary of signals exchanged in the electronic circuit according to the method according to one or more embodiments.

As shown better in FIG. 4, in some embodiments, the system 10' may use updated interface signals, both between the regulator and also control and interface signals IS, where in particular digital input and output DIO signals and pin are transformed in interrupt request signals IRQ.

Some embodiments control the power management of the RF circuit for sharing DC/DC converter 1211.

Figure 3:
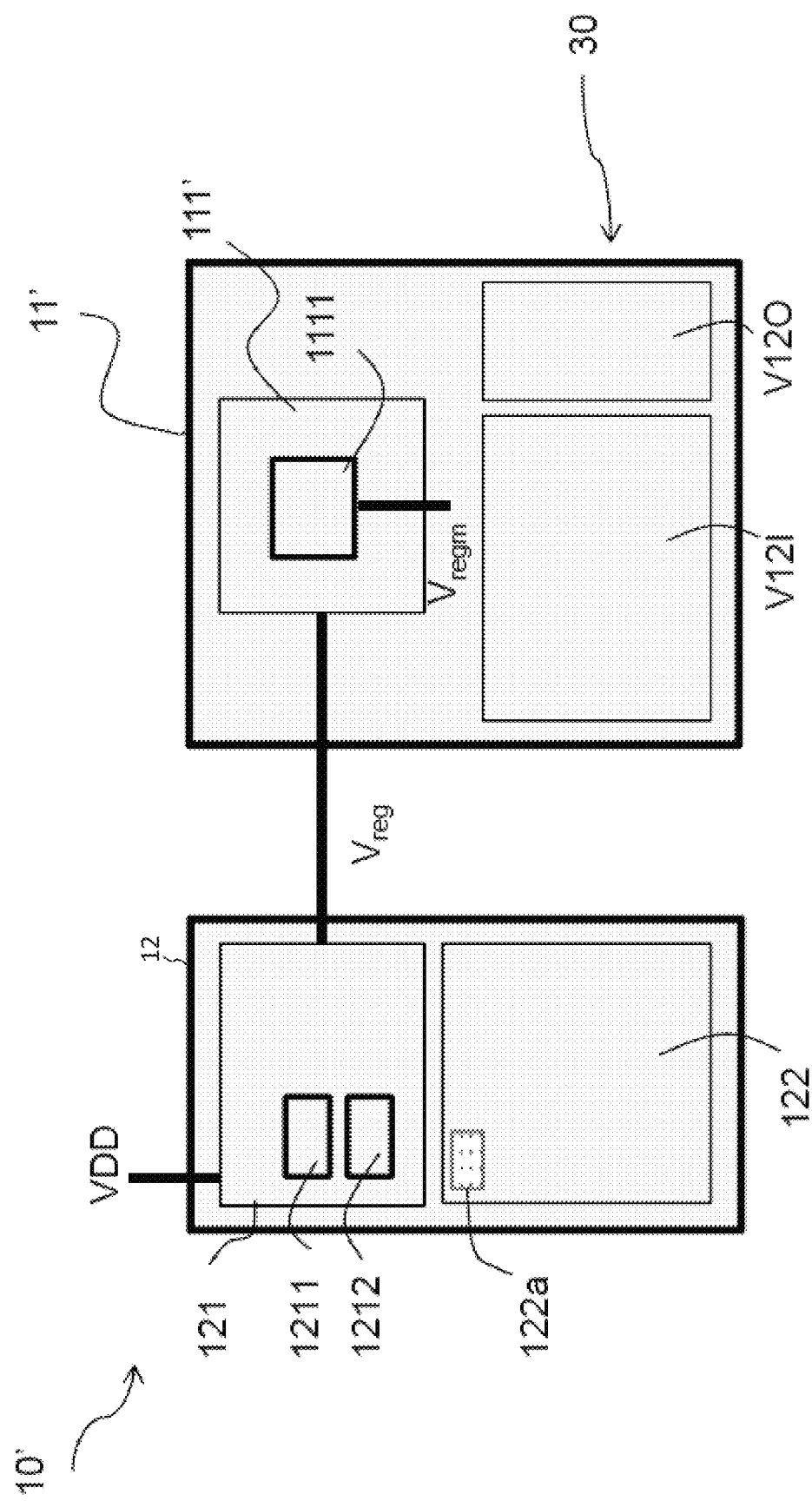
FIG. 3 is a further schematic example of such electronic circuit.

In FIG. 3 is schematized in a simplified way the RF circuit 12 of the system 10', including the power regulator block 121, including the DC-DC converter 1211 and the linear regulator 1212, and the RF module 122. As shown in FIG. 3, RF module 122 includes a RAM memory module 122a.

The power regulator block 121 receives the digital voltage VDD and outputs the regulated voltage $V_{reg}$ (e.g., 1.5 V) at pin VREG to the main regulator 111' of the microcontroller 11', specifically to the linear regulator 1111'. Linear regulator 1111' then outputs a microcontroller regulated voltage $V_{regm}$ (which may be at 1.2 V) to a core of the microcontroller 11'. Microcontroller 11' is here represented as comprising a first interruptible digital voltage domain V12I (i.e., a domain to which supply can be interrupted although other parts of the microcontroller 11 are powered), and a second "always on" digital voltage domain V12O (i.e., a domain which is always on if the microcontroller is powered).

In low power operation, low power regulator 112 (not shown in FIG. 3) receives the digital voltage VDD and outputs a low power voltage to the same first interruptible digital voltage domain V12I and second "always on" digital voltage domain V12O as shown in the following.

The arrangement of system 11' uses an updated control of the power management in circuit 12 (since there is only one shared DC-DC converter: DC-DC converter 1212 in the RF circuit 12).

RF circuit 12 includes the following standard operation modes, e.g., usually implemented by a SX 1262 transceiver: a set of low power modes or states, at power off, and a set of active operation modes or states.

The set of low power modes or states, at power off, includes a first low power deep sleep mode LP1 and a second sleep mode LP2. In the first low power deep sleep mode LP1 all the blocks of the RF circuit 12 are off (with the exception of circuits, e.g., an oscillator, used to wake up the circuit in sleep mode). This for instance, in implementation with a SW1262 like transceiver, may involve a 50 nA power consumption.

In the second sleep mode LP2 all the blocks of the RF circuit 12 are off (with the exception of SSC, Backup RAM 122a and optionally RC64K). This for instance, in implementation with a SW1262 like transceiver, may involve 150 nA power consumption.

The set of active operation modes or states includes a first active standby mode A1 and a second active operating mode A2. The first active standby mode A1 includes circuits ready and the 13 MHz RC oscillator (RC13M) is enabled for all SPI communication. Within the first active standby mode A1, in some embodiments, a sub-mode with oscillator 126 on requires that the DC-DC converter 1211 is on and a sub-mode with oscillator 126 off requires that the LDO 1212 is on.

The second active operating mode A2 is, e.g., for frequency synthesis FD, transmission and reception, where such functions are fully enabled.

According to one or more embodiments, two further lower power modes are added to sleep modes LP1, LP2:

a third low power sleep LDO mode LP3, in which the LDO regulator 1212 is maintained on. Optionally the Backup RAM 122a is maintained on, while the oscillator 126 can be on or off, depending on the specified configuration; and a fourth low power sleep buck mode LP4, in which the DC-DC converter 1212 (e.g., a buck converter) is maintained on.

The active modes remain unchanged (as first active standby mode A1 and second active operating mode A2).

The signal exchanged between microcontroller 11' and RF circuit 12 are modified accordingly as shown in FIG. 4.

With regards to FIG. 4, the microcontroller 11' comprises a dedicated asynchronous power control interface S_BAT, which includes signals to allow the microcontroller to command the further sleep modes LP3, LP4. The signals slp_l-do_bat, and slp_buck_bat enable the corresponding regulator 1212, 1211 and corresponding ready signals (ldo_ready_bat, and buck_ready_bat signals) are issued in response by a corresponding interface of the RF circuit 12 to the microcontroller 11'. Power control interface S_BAT also includes por_bat signal sent from a reset logic module 1113*a* associated to the Power On reset voltage monitor of the microcontroller 11 to the RF circuit 12 to command a Power On Reset, e.g., if the digital voltage VDD goes below a given threshold. A signal nreset_bat is a digital reset signal sent by the same logic module 1113*a*.

The signal slp_ldo_bat is an LDO enable signal issued by logic power control module ma to allow the microcontroller 11' to command the adoption of the third low power mode LP3 by commanding the RF circuit 12 to enable the LDO regulator 1212.

The slp_buck_bat signal is a DC-DC converter enable issued by logic power control module 111*a* to allow the microcontroller 11' to command the adoption of the fourth low power mode LP4, enabling the converter 1211. Corresponding ready signals ldo_ready_bat and buck_ready_bat signals are issued by the corresponding logic module (not shown) of the RF circuit 12 to the microcontroller 11'.

Other logic control modules/interfaces for managing exchange of signals with corresponding modules in the circuit 12, include 112*a*, 113*a*, 114*a*, 115*a*, 116*a*, 117*a*, which may be implemented through one or more processors in the core 30.

A logic isolation module 112*a* receives from the RF circuit 12 a set_iso_n_bat signal to signal that the domain of the digital voltage Vdig is on or off. The digital voltage Vdig, sent to module 112*a* as well, is obtained from the digital RF voltage supply VDDRF which represents the input voltage of the regulator 121.

The signal of the interface 113*a* has been already described. As mentioned, the digital input output pin DIO are GPIO which are configured as interrupt request IRQ signal lines.

A monitor interface 117*a* exchanges Eol (End of Life) monitoring signals, Eol_bat and Eol_en_bat (enabling the monitor).

A power oscillator logic module 114*a* includes power enabling signals tcxo_pwr_en_bat and tcxo_en_bat to enable a power supply power_tcxo, obtained from RF supply VDDRF, to be passed to the microcontroller 11'.

A oscillator clock logic module 115*a* includes exchanging handshake signals clk_32*m*_en_bat (enable) and clk_32*m*_rdy_bat (ready) to allow an external clock signal clk_32*m*_1*v*2 from oscillator 126 to be used in the microcontroller 11'. The microcontroller 11' supplies a driver of the clock signal clk_32*m*_1*v*2 with the microcontroller regulated voltage $V_{regm}$ at 1.2V.

A test logic module 116*a* in circuit 11' receives test signals DTB and ATB from the circuit 12 and sends a SCAN signal to circuit 12.

FIGS. 5A-5E show different configuration of the system 10', corresponding to different modes or states of the RF circuit 12 and microcontroller 11'.

In FIGS. 5A and 5B it is shown a configuration in which the microcontroller 11' is the master. The dark blocks are off blocks, the dotted blocks are blocks powered by the regulated voltage $V_{reg}$ from the DC-DC converter 1211 or from the LP regulator 112.

In FIG. 5A the RF circuit 12 is in the third low power mode LP3 or fourth low power mode LP4 and the microcontroller 11' is in a normal power operating state MR, i.e., a normal run, or a first low power stop state, STOP 0 in STM32.

The power regulator 121 is switch-on controlled in hardware at power-on/wake-up and supplies the main regulator 111', which in its turn powers the first interruptible voltage domain V12*i* and the second "always on" voltage domain V12O of the microcontroller 11'. A wake up of the RF portion 122 is performed by software.

In FIG. 5B the RF circuit 12 is in one of its active modes A1/A2 and the microcontroller 11' is also in the normal power operating state MR. Only the low power regulator 112 is off.

In FIGS. 5C, 5D is shown a configuration in which the microcontroller 11' is operating in low power mode. The RF circuit 12 is in one of the standard low power mode, in sleep mode LP1 or deep sleep mode LP2, which means block 121 and 122 off, with the RAM 122*a* optionally powered. The microcontroller 11' can be (FIG. 5C) in a low power run state or a low power stop state, specifically STOP 1 or STOP 2, which involve less consumption than STOP 0. The main regulator 111' is off, since no power is coming from the RF circuit 12, the microcontroller 11', i.e., the always on voltage domain V120 and optionally the interruptible voltage domain V12I, is powered by the Low Power regulator 112 coupled to the digital voltage supply VDD. The microcontroller 11' can be also (FIG. 5D) in a Standby MSB or Standby RAM MSBw state, i.e., with the RAM of the microcontroller 11' unpowered or not.

In FIG. 5E it is shown a configuration in which the RF circuit 12 operates autonomously, i.e., in a so-called listen mode. The RF circuit 12 is in active mode A2 and the microcontroller 11 in standby state MSB.

Figure 6:
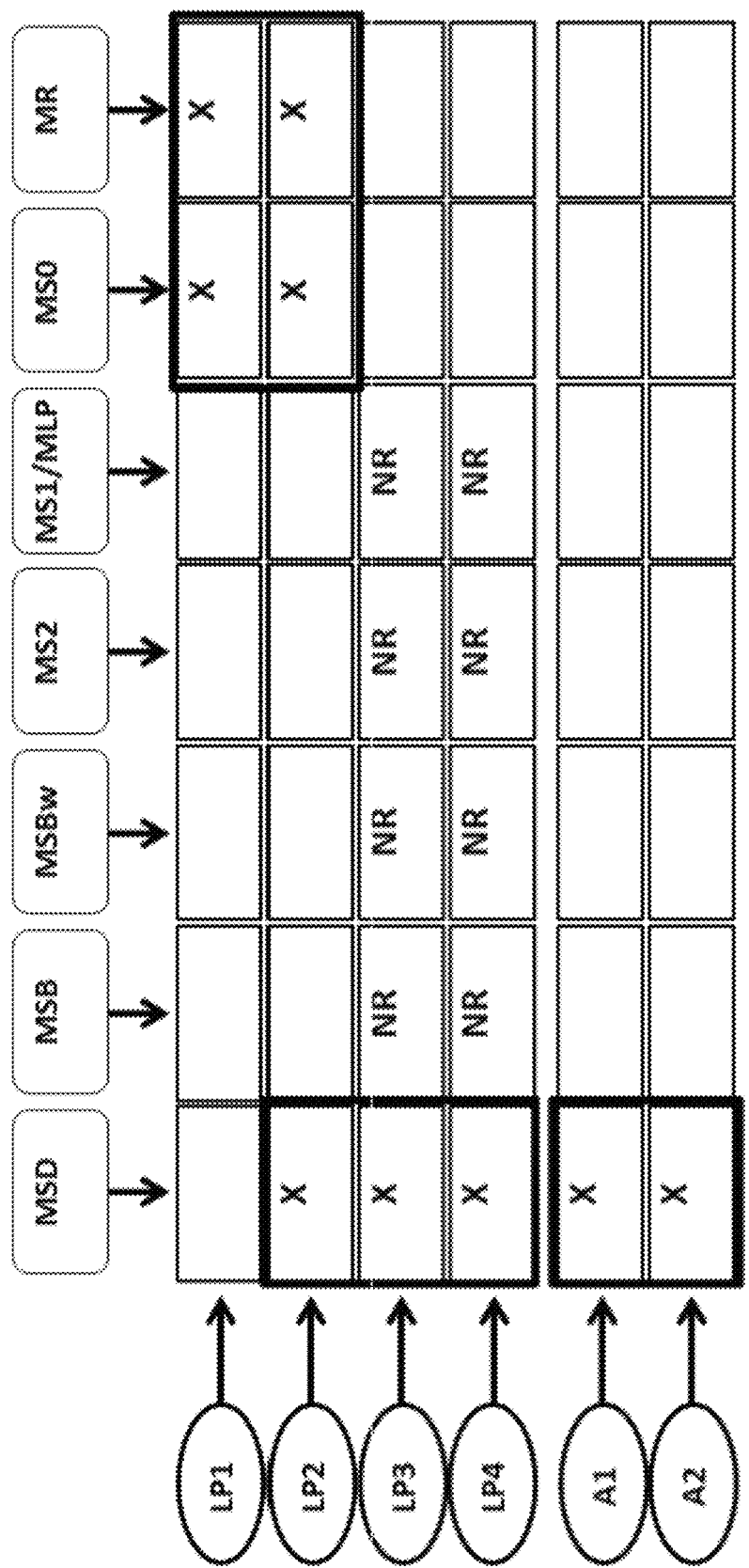
FIG. 6 is exemplary of a table of allowed operation states in the electronic circuit according to the method according to one or more embodiments.

FIG. 6 shows the modes of operation of the microcontroller 11'.

The microcontroller 11' modes or states, such as the STM32 modes, are:
Shutdown MSD;
Standby MSB;
Standby with RAM backup MSBw;
STOP 2 (Low power mode) MS2;
STOP 1 (Low power mode) MS1;
Low Power Run (Low power mode) MLP;
Run MR;
STOP 0 MS0.

In shutdown state MSD, the RF circuit 12 is forced in a strongest rested state, corresponding to the deep sleep mode LP2. As a consequence, autonomous operation of the RF circuit 12 is not possible. This choice may be needed to prevent out of specification RF operating conditions, since the voltage monitor 117*a* is off.

In states MSB, MS2, MS1 and MLP, the switch off of the regulators, DC-DC converter 1211 and linear regulator 1212 in the power regulator 121 is selected. Such regulators 1211, 1212 can still be switched-on by RF (autonomous operation).

In states MR, MS0, the linear regulator 1212 switch-on is forced by the microcontroller 11'. The linear regulator 1212 cannot be switched-off by the circuit 12.

The sleep mode power states, LP3, LP4 can be switched-on by the microcontroller 11' by programming a dedicated register in the power controller.

The RF circuit modes or stats LP1, LP2, LP3, LP4, A1, A2 have been illustrated previously.

The table in FIG. 6 indicates the RF circuit 12 modes in rows and the microcontroller 11' modes in columns.

The "X" indicates forbidden states.

As shown, when microcontroller 11' is in Shutdown MSD, low power LP2, LP3, LP4 cannot be adopted, since the system restarts with a power on reset. Also active states A1, A2 cannot be adopted since RF, in particular LoRa, functionality cannot be ensured as voltage monitor 1113 is OFF.

When the RF circuit 12 is in deep sleep Run and Stop are forbidden, since as the main regulator 111' needs supply, regulators 1211 or 1212 must be active.

With NR are indicated states which are set as non reachable since keeping regulators 1211 and 1212 on in LP mode, if not requested for LoRa, may lead to an excessive extra consumption. Entry in these states is prevented by hardware.

All the remaining combinations of LoRa and STM32 power modes are possible and reachable by sw configuration in the control logic modules of the microcontroller 11'.

Summing up, the method here described provides preventing entry by hardware in determined modes of operation, specifically MSB, MSBw, MS2, MS1/MLP of the microcontroller 11' when the RF circuit 12 is in the first further sleep mode LP3 or second further sleep mode LP4. Other states may not be adopted because of lack of functionalities.

Figure 7:
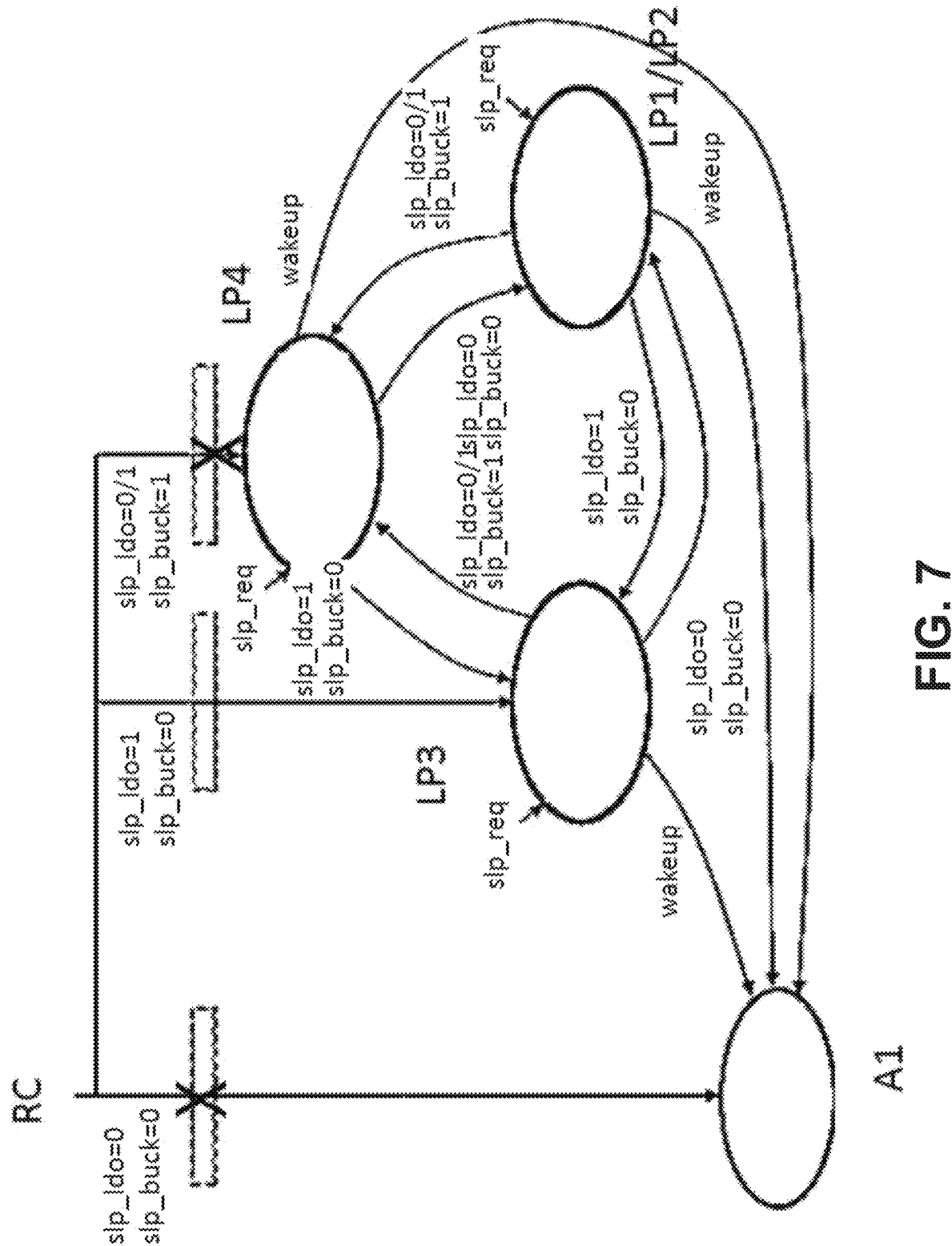
FIG. 7 is exemplary of a diagram state of a power-on reset procedure in the electronic circuit according to the method according to one or more embodiments.

In FIG. 7 it is shown a state diagram showing the operating modes at power-on of the system 10', specifically of the RF circuit 12, which are commanded through for instance the power logic module 111a.

On a power reset condition or state, indicated with RC, it can directly perform a transition only to the third low power sleep LDO mode LP3, with slp_ldo_bat signal at high logic level and slp_buck_bat signal at low logic level or the fourth low power sleep buck mode LP4, with slp_ldo_bat signal at low logic level and slp_buck_bat signal at high logic level. Reaching the standby mode A1 directly at the power reset condition RC, if slp_ldo_bat signal at low logic level and slp_buck_bat signal at low logic level is forbidden. Also from the power reset condition RC if the slp_ldo_bat signal is set at low logic level or high logic level and slp_buck_bat signal is asserted at high logic level, a transition to buck mode LP4 is forbidden.

From the fourth low power sleep buck mode LP4:
upon receiving a wakeup signal a transition to the standby mode A1 is performed;
also, if the slp_ldo_bat signal is set at low logic level and slp_buck_bat signal at low logic level, a transition from LP3 to one of standard sleep mode LP1 or LP2 is performed;
if the slp_ldo_bat signal is set at high logic level and slp_buck_bat signal is set at low logic level, a transition to LDO mode LP3 is performed From the third low power sleep LDO mode LP3:
upon receiving a wakeup signal a transition to the standby mode A1 is performed;
also, if the slp_ldo_bat signal is set at low logic level and slp_buck_bat signal at low logic level, a transition from LP3 to one of standard sleep mode LP1 or LP2 is performed;
if the slp_ldo_bat signal is set at low logic level or high logic level and slp_buck_bat signal is asserted at high logic level, a transition to buck mode LP4 is performed.

From the standard sleep modes LP1/LP2:
upon receiving a wakeup signal a transition to the standby mode A1 is performed;
if the slp_ldo_bat signal is set at high logic level and slp_buck_bat signal is set at low logic level, a transition to LDO mode LP3 is performed if the slp_ldo_bat signal is set at low logic level or high logic level and slp_buck_bat signal is asserted at high logic level, a transition to buck mode LP4 is performed.

Al the sleep modes LP1/LP2, LP3, LP4 are accessed if the control logic issues a corresponding sleep request slp_req.

In a condition in which the system 10' switches from a state in which the RF circuit 12 is active, and the microcontroller 11' is in standby (e.g., state of FIG. 5A), to a state in which microcontroller 11' is active and the RF circuit 12 is off, a part for the power regulator, e.g., state of FIG. 5E, during the switch a race condition may rise as the RF circuit 12 may request switch off and the microcontroller 11 may requests switch off as well.

Figure 8:
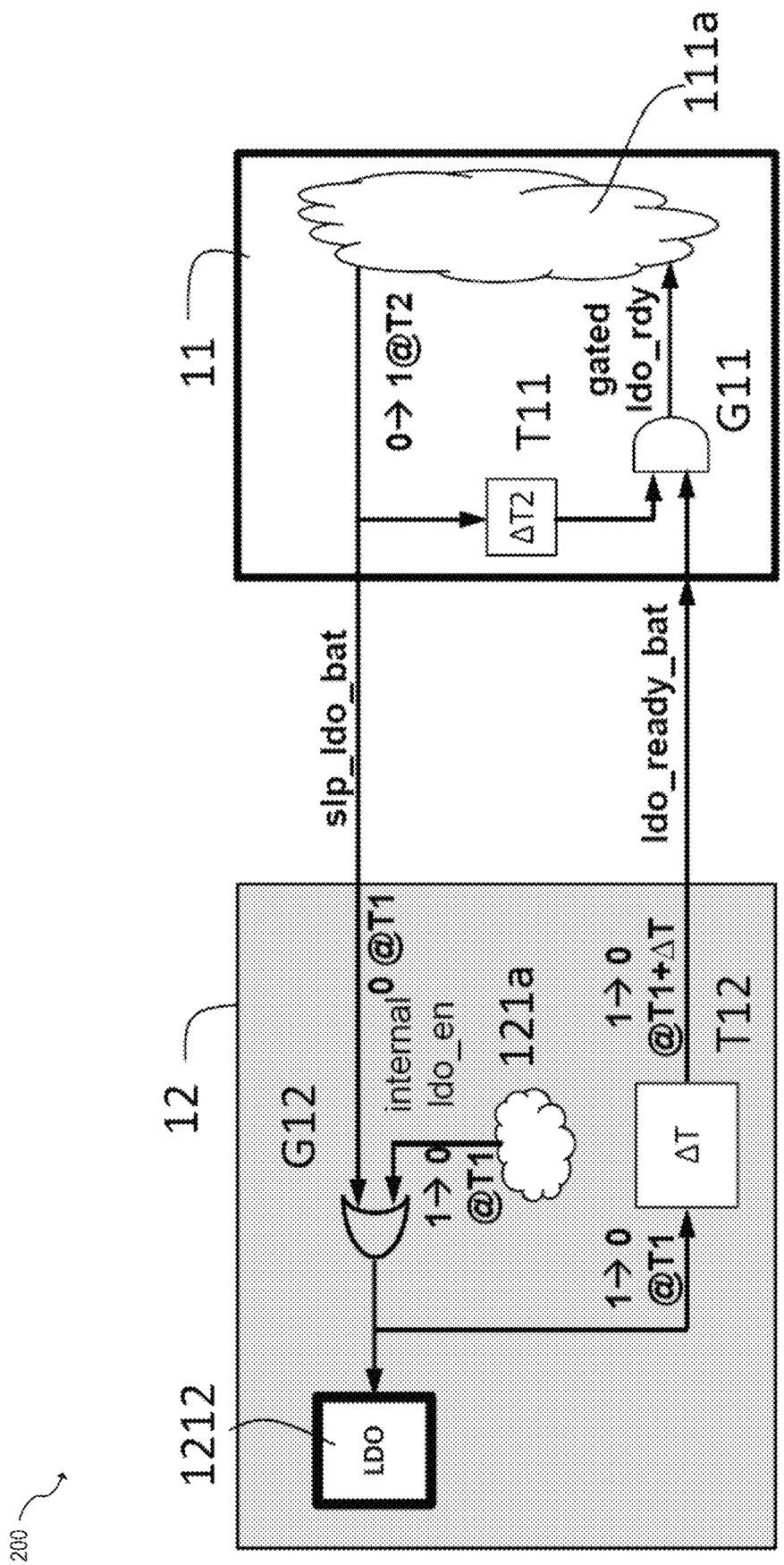
FIG. 8 is exemplary of a synchronization circuit operating in the electronic circuit operating according to the method according to one or more embodiments.

In order to avoid that, a synchronization circuit 200, shown schematically in FIG. 8, is provided, which operates on the enable and ready signals of the asynchronous interface S_BAT, in particular of logic module 111a, slp_ldo_bat, and ldo_ready_bat, to avoid such race. In particular the synchronization circuit 200 includes an OR gate or a circuit representing such logic function G12, arranged in the RF circuit 12, receiving the slp_ldo_bat signal, in the example logic zero, commanding the third mode LP3 and an internal LDO enable signal int_ldo_en from a logic module 121a internal to RF circuit 12, which commands internally the switch-on of the linear regulator 1212 and which in the example transitions from logic one to logic zero at a first switch time instant T1. The resulting signal outputted from the OR gate G12 switches off the linear regulator 1211. The synchronization circuit 200 includes also a delay block T12 which delays such resulting signal of a first time delay ΔT, generating the ready signal ldo_ready_bat transmitted to the microcontroller 11'. There the synchronization circuit 200 comprises an AND gate receiving the ready signal ldo_ready_bat and a second delay circuit T11 operating on the slp_ldo_bat signal, in particular from a second switch time instant T2, to provide a corresponding version delayed of a second time delay ΔT2 to the AND gate G11, which therefore outputs a gated version of the ldo_ready signal to the logic module 111a, i.e., to the microcontroller 11'.

Figure 9:
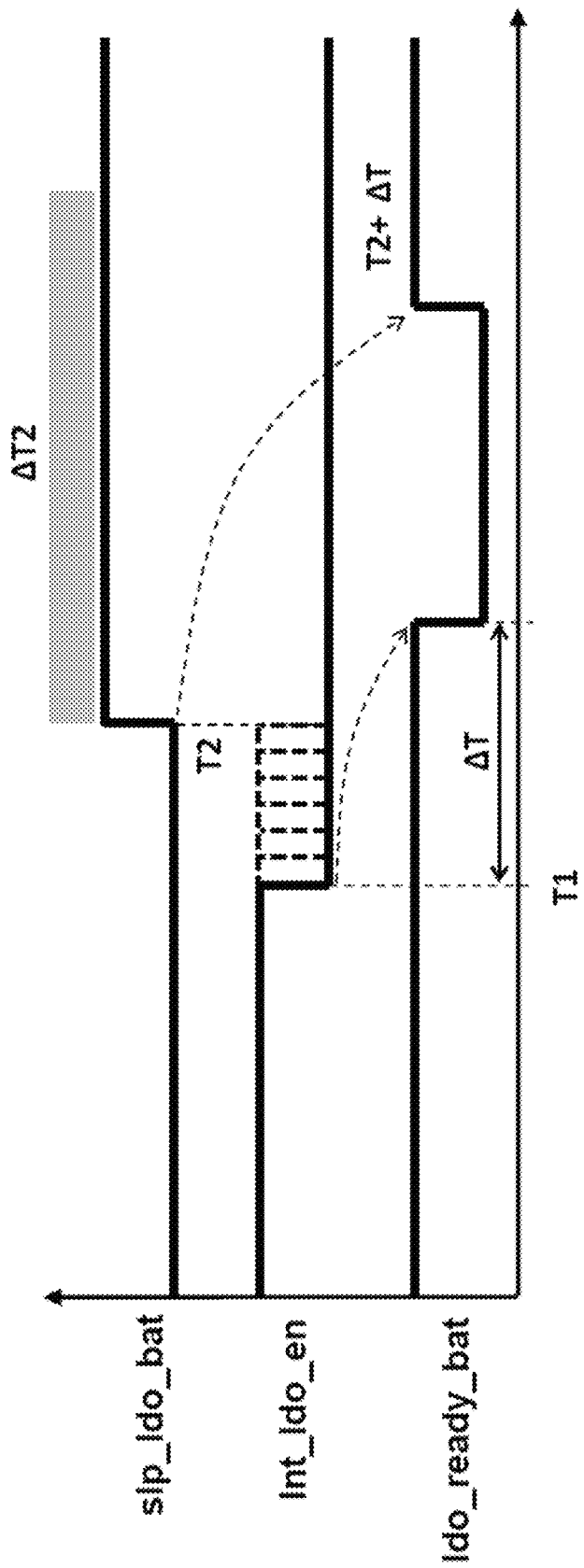
FIG. 9 is a time diagram of signals of the synchronization circuit of FIG. 8.

In FIG. 9 it is shown a corresponding time diagram of the slp_ldo_bat, internal LDO enable signals int_ldo_en, and ldo_ready_bat signal. The second time delay ΔT2 is chosen as greater that a wake up time WT of the power regulator 121 of circuit 12 and represents a blind window for the signal slp_ldo_bat, which sets the third mode LP3.

Initially the slp_ldo_bat signal is at logic zero, i.e., the microcontroller 11' is not requesting the switch off of the linear regulator 1212, the int_ldo_en signal is set logic one since the linear regulator 1212 is on powering the circuit 12, and the LDO ready signal ldo_ready_bat is logic one as well as the linear regulator 1212 is operating.

Then at the first switch time T1 the RF circuit 12 commands the int_ldo_en signal to transition to logic zero to switch off the linear regulator 1212. The linear regulator 1212 switches off. However, the ldo_ready_bat signal goes to logic zero not at first time T1, but only after the first delay ΔT. At the second time T2 the microcontroller 11' commands the switch on of the linear regulator 1212 to draw power. The slp_ldo_bat signal goes high and the linear regulator 1212 switches on, with a certain wake up time WT. The signal ldo_ready_bat therefore goes high only after the wake up time WT has elapsed. However, because of delay circuit T11 the second input of the AND gate G12, which outputs the gated ready signal for the microcontroller 11', goes high only after a time T2+ΔT2, which is after the wake up time WT. Thus the second delay block T12 applies a time delay which is greater than the wake up time WT so that ensures that the gated LDO ready signal ldo_ready_bat is received by the microcontroller 11' after the wake up time WT. Since the worst case is the time T1 is equal to time T2, i.e., the circuit 200 avoids that the microcontroller 11' draws power before the wake up is completed.

It will be appreciated that the embodiments are not limited to application in the context of microcontrollers (e.g., STM32 microcontroller) applications with embedded RF circuit(s) for IoT (e.g., SW1262 Semtech) for LoRa applications, e.g., for multi-purpose microprocessor-based consumer applications such as home appliances and the like.

One or more embodiments may thus provide a method for managing the power supply in an electronic circuit comprising a processing system, in particular a general purpose microcontroller or a System-on-Chip or a subsystem thereof, with an RF embedded circuit, the processing system comprising at least a processing core and a first power regulation module supplying a first regulated voltage to the processing core, the RF embedded circuit comprising a second power regulation module supplying a second regulated voltage to circuits of the RF embedded circuit including a RF transceiving portion, the second power regulation module comprising a switched-mode power supply and generating a second regulated voltage, the method comprising coupling the second regulated voltage as voltage input of the first power regulation module, the first power regulation module which generates as an output a respective first regulated voltage for the processing core, controlling the second power regulation module to operate according to a plurality of operation modes including one or more sleep modes in which both the DC-DC converter and the second linear regulator are off, and one or more active modes in which both the DC-DC converter and the second linear regulator are on, wherein the second power regulation module comprises a second linear regulator, and the plurality of modes includes a first further sleep mode in which the switched-mode power supply is off and the second linear regulator is on, and a second further sleep mode in which the switched-mode power supply is on and the second linear regulator is off.

In one or more embodiments the first further sleep mode and second further sleep mode are controlled by the processing system.

In one or more embodiments the method includes controlling the first further sleep mode and second further sleep mode by a dedicated asynchronous power control interface operating in the processing system which includes a signal to allow the microcontroller to command the first further sleep mode and a signal to allow the microcontroller to command the second further sleep mode, corresponding ready signals being issued in response by a corresponding interface of the RF circuit to the microcontroller.

In one or more embodiments such dedicated asynchronous power control interface includes a logic module issuing a signal commanding the power on reset of the RF circuit.

In one or more embodiments, the method includes forbidding entry in determined modes of operation of the processing system when the RF circuit is first further sleep mode or a second further sleep mode.

In one or more embodiments, the method includes allowing the RF circuit to access directly from a power on reset state only the first further sleep mode.

In one or more embodiments, the method includes providing a first digital power supply voltage and second RF power supply voltage at any time, the first digital power supply voltage being lower than or equal to the second RF power supply voltage, the second RF power supply voltage being supplied as input voltage to the second power regulator to obtain the regulated voltage, which has in particular a value lower than said first digital power supply voltage and second RF power supply voltage.

In one or more embodiments, the method includes applying a delay to a ready signal, of the second linear regulator and a second delay to the signal to allow the microcontroller to command the first further sleep mode, the second delay having a value greater than an wake up time of the second linear regulator to perform a gating of the ready signal, before supplying it to the processing system, allowing the RF circuit to enable the linear regulator when the signal to allow the processing system to command the first further sleep mode commands switch off in order to avoid a race condition between the processing system and transceiving circuit.

One or more embodiments may also provide an electronic circuit comprising a processing system, in particular a general purpose microcontroller or a System-on-Chip or a subsystem thereof, with a RF embedded circuit, the processing system comprising at least a processing core and a first power regulation module supplying a first regulated voltage to said processing core, the RF embedded circuit comprising a second power regulation module supplying a second regulated voltage to circuits of the radiofrequency embedded circuit including a RF transceiving portion, the second power regulation module comprising a switched-mode power supply and generating a second regulated voltage, the second regulated voltage being coupled as voltage input of the first power regulation module configured to generate as an output a respective first regulated voltage for the processing core, the second power regulation module comprising a second linear regulator configured to generate the second regulated voltage.

In one or more embodiments the electronic circuit operates the power management according to the method according to one or more embodiments.

In one or more embodiments the apparatus (e.g., a microcontroller-based appliance) may include a system according to one or more embodiments.

Without prejudice to the underlying principles, the details and embodiments may vary, even significantly, with respect to what has been described, by way of example only, without departing from the extent of protection.

The extent of protection is defined by the annexed claims.

What is claimed is:

1. A method for power management in an electronic circuit that comprises a processing system and a radiofrequency (RF) embedded circuit, wherein the processing system comprises a processing core and a first power regulation module that comprises a first linear regulator, and wherein the RF embedded circuit comprises a second power regulation module comprising a switched-mode power supply and a second linear regulator, the method comprising:
generating a first regulated voltage with the second power regulation module;
supplying the first regulated voltage to a first RF circuit of the RF embedded circuit;
receiving with the first power regulation module the first regulated voltage from the second power regulation module;
generating a second regulated voltage from the first regulated voltage with the first linear regulator;
supplying the second regulated voltage to the processing core; and controlling the second power regulation module to operate according to a plurality of operation modes of the RF embedded circuit, wherein the plurality of operation modes comprises:
- a first sleep mode in which the switched-mode power supply is off and the second linear regulator is off;
- a second sleep mode in which the switched-mode power supply is off and the second linear regulator is on;
- a third sleep mode in which the switched-mode power supply is on and the second linear regulator is off; and
- a first active mode in which the switched-mode power supply is on and the second linear regulator is on.

2. The method of claim 1, further comprising controlling the second and third sleep modes with the processing system.

3. The method of claim 2, wherein controlling the second and third sleep modes comprises using a dedicated asynchronous power control interface operating in the processing system, wherein the dedicated asynchronous power control interface of the processing system is coupled to a dedicated asynchronous power control bus that is coupled to a corresponding dedicated asynchronous power control interface of the RF embedded circuit, wherein the dedicated asynchronous power control bus comprises:
- a first signal line to allow the processing system to command the second sleep mode;
- a second signal line to allow the processing system to command the third sleep mode;
- a third signal line corresponding to the first signal line to allow the RF embedded circuit to respond to the processing system when the processing system commands the second sleep mode; and
- a fourth signal line corresponding to the second signal line to allow the RF embedded circuit to respond to the processing system when the processing system commands the third sleep mode.

4. The method of claim 3, wherein the dedicated asynchronous power control bus further comprises a fifth signal line to allow a logic module of the processing system to command a power on reset of the RF embedded circuit.

5. The method of claim 3, further comprising:
- supplying a first signal to the first signal line by the processing system;
- receiving the first signal from the first signal line with an OR gate of the RF embedded circuit;
- generating a ready signal with the OR gate based on the received first signal;
- enabling the first linear regulator with the ready signal;
- applying a first delay to the ready signal;
- applying a second delay to the first signal, the second delay having a value greater than a wake-up time of the second linear regulator;
- receiving the delayed ready signal and the delayed first signal with an AND gate of the processing system; and
- drawing power from the first linear regulator by the processing system based on an output of the AND gate.

6. The method of claim 1, further comprising forbidding entry in determined modes of operation of the processing system when the RF embedded circuit is in the second or third sleep modes.

7. The method of claim 1, further comprising:
- allowing the RF embedded circuit to access directly from a power on reset state the second sleep mode; and
- forbidding the RF embedded circuit to enter the third sleep mode directly from the power on reset state.

8. The method of claim 1, further comprising:
- providing a first digital power supply voltage to the processing system; and
- providing a second RF power supply voltage to the RF embedded circuit, wherein the second power regulation module generates the first regulated voltage from the second RF power supply voltage, wherein the first digital power supply voltage is lower than or equal to the second RF power supply voltage, and wherein the first regulated voltage is lower than the first digital power supply voltage.

9. The method of claim 1, wherein the processing system comprises a general purpose microcontroller.

10. The method of claim 1, wherein the first RF circuit is an RF transceiving circuit.

11. The method of claim 1, wherein the first regulated voltage is between 1.45 V and 1.62 V, and wherein the second regulated voltage is about 1.2 V.

12. The method of claim 1, wherein the RF embedded circuit is a lower power low range (LoRa) transceiver.

13. An electronic circuit comprising:
- a processing system comprising a processing core and a first power regulation module that comprises a first linear regulator configured to supply a first regulated voltage to the processing core; and
- a radiofrequency (RF) embedded circuit comprising a second power regulation module configured to supply a second regulated voltage to a first circuit of the RF embedded circuit and to the first linear regulator, the second power regulation module comprising a switched-mode power supply and a second linear regulator, wherein the processing system is configured to control the second power regulation module to operate according to a plurality of operation modes of the RF embedded circuit, wherein the plurality of operation modes comprises:
  - a first sleep mode in which the switched-mode power supply is off and the second linear regulator is off,
  - a second sleep mode in which the switched-mode power supply is off and the second linear regulator is on,
  - a third sleep mode in which the switched-mode power supply is on and the second linear regulator is off, and
  - a first active mode in which the switched-mode power supply is on and the second linear regulator is on.

14. The electronic circuit of claim 13, further comprising a dedicated asynchronous power control bus coupled between the processing system and the RF embedded circuit, wherein the dedicated asynchronous power control bus comprises:
- a first signal line to allow the processing system to command the second sleep mode;
- a second signal line to allow the processing system to command the third sleep mode;
- a third signal line corresponding to the first signal line to allow the RF embedded circuit to respond to the processing system when the processing system commands the second sleep mode; and
- a fourth signal line corresponding to the second signal line to allow the RF embedded circuit to respond to the processing system when the processing system commands the third sleep mode.

15. The electronic circuit of claim 14, wherein the dedicated asynchronous power control bus further comprises a fifth signal line to allow a logic module of the processing system to command a power on reset of the RF embedded circuit.

16. The electronic circuit of claim 14, wherein the embedded RF circuit comprises an OR gate having an input coupled to the first signal line and an output coupled to an enable input of the second linear regulator, and a first delay circuit having an input coupled to the output of the OR gate and an output coupled to the third signal line, and wherein the processing system comprises a second delay circuit having an input coupled to the first signal line, and an AND gate having a first input coupled to an output of the second delay circuit, a second input coupled to the third signal line.

17. The electronic circuit of claim 16, wherein the second delay circuit is configured to apply a second delay having a value greater than a wake-up time of the second linear regulator.

18. The electronic circuit of claim 13, wherein the processing system is a general purpose microcontroller.

19. An apparatus comprising:
a processing system comprising a processing core and a first power regulation module that comprises a first linear regulator configured to supply a first regulated voltage to the processing core;
a radiofrequency (RF) embedded circuit comprising a second power regulation module configured to supply a second regulated voltage to a first circuit of the RF embedded circuit and to the first linear regulator, the second power regulation module comprising a switched-mode power supply and a second linear regulator; and
a printed circuit board (PCB) coupled to the processing system and to the RF embedded circuit, the PCB comprising a dedicated asynchronous power control bus coupled between the processing system and the RF embedded circuit, wherein the processing system is configured to control the second power regulation module via the dedicated asynchronous power control bus to operate according to a plurality of operation modes of the RF embedded circuit, wherein the plurality of operation modes comprises:
a first sleep mode in which the switched-mode power supply is off and the second linear regulator is off,
a second sleep mode in which the switched-mode power supply is off and the second linear regulator is on,
a third sleep mode in which the switched-mode power supply is on and the second linear regulator is off, and
a first active mode in which the switched-mode power supply is on and the second linear regulator is on.

20. The apparatus of claim 19, wherein the processing system comprises a general purpose microcontroller and the RF embedded circuit comprises an RF transceiver for lower power low range (LoRa) applications.

* * * * *